United States Patent [19]
Franks et al.

[11] Patent Number: 6,105,986
[45] Date of Patent: Aug. 22, 2000

[54] HANDCYCLE

[76] Inventors: Jon Franks, 360 N. Sepulveda, Ste. 1030, El Segundo, Calif. 90245; Tim Brummer, 312 Ninth St., Lompoc, Calif. 93436

[21] Appl. No.: 08/909,113

[22] Filed: Aug. 11, 1997

[51] Int. Cl.⁷ ............................................. B62M 1/14
[52] U.S. Cl. ........................ 280/250; 280/267; 280/288.1
[58] Field of Search ........................... 280/249, 250, 280/268, 271, 267, 282, 288.1

[56] References Cited

U.S. PATENT DOCUMENTS

| | | | |
|---|---|---|---|
| 4,109,927 | 8/1978 | Harper | 280/250 |
| 4,432,561 | 2/1984 | Feikema et al. | 280/281 |
| 4,497,502 | 2/1985 | Forbes et al. | 280/242.1 |
| 4,546,997 | 10/1985 | Smyers | 280/772 |
| 4,548,421 | 10/1985 | Wiener | 280/267 |
| 4,705,284 | 11/1987 | Stout | 280/242.1 |
| 5,022,671 | 6/1991 | Jones, Jr. | 280/242.1 |
| 5,354,084 | 10/1994 | Lofgren et al. | 280/250 |
| 5,544,906 | 8/1996 | Clapper | 280/288.1 |
| 5,568,935 | 10/1996 | Mason | 280/282 |
| 5,611,555 | 3/1997 | Vidal | 280/113 |

*Primary Examiner*—Lanna Mai
*Assistant Examiner*—Andrew J. Fischer
*Attorney, Agent, or Firm*—Roger A. Marrs

[57] ABSTRACT

A handcycle having a hand drive mechanism for powering the cycle which includes an attitude control system having an elastomer member serving as a resilient member to resist leaning forces. The system includes adjustability to accommodate weights of various riders so that a proper stabilizing opposing force is applied. An adjustable steering angle mechanism is provided on the handcycle frame permitting smooth movement regardless of the steering angle.

1 Claim, 3 Drawing Sheets

HANDCYCLE

BACKGROUND OF THE INVENTION

1. Field of the Invention

The present invention relates to the field of handcycles useful for impaired persons, and particularly to a novel handcycle having an attitude control system as well as a variable angle steering axis.

2. Brief Description of the Prior Art

In the past, handcycles have been employed which are difficult to steer, particularly by physically impaired persons. Generally, such problems and difficulties are experienced because fixed steering angles are employed which are not adjustable and therefore, steering by leaning of the operator in one direction or the other has no effect and is an option not available to the handcycle operator. Therefore, prior handcycles do not have a means for accommodating variable angle steering axis. Furthermore, prior handcycles do not have an attitude control system which makes the handcycle dynamically unstable without such a mechanism. Inasmuch as the center of mass of the rider or user is above the steering axis of the cycle, the weight of the rider tends to make the cycle lean to one side or the other. No resisting mechanism is available to stabilize or control the attitude of the vehicle.

Therefore, a long-standing need has existed to provide mechanism and controls for a handcycle which may be steered by leaning of the rider which includes a variable angle steering axis coupled with an attitude control system.

SUMMARY OF THE INVENTION

Accordingly, the above problems and difficulties are avoided by the present invention which provides a novel handcycle having a frame with a front steerable wheel and a pair of rear wheels with a seat occupied by the driver disposed on the frame between the front and rear wheels. Hand drive means are carried on the frame in operable arrangement with the front steering wheel and an attitude control system couples the rear wheels with the frame which includes an elastomer member serving as a resilient means adapted to resist leaning forces. The resistance of the elastomer member includes adjustable means so that the resistance or hardness can be changed to closely match forces applied to the elastomer member by the riders having different weights so that a proper stabilizing opposing force is applied. Furthermore, means are provided for incorporating an adjustable steering angle by utilizing a lower pivot point which slides along the main frame and which employs spherical bearings in order to allow smooth movement regardless of the steering angle.

Therefore, it is among the primary objects of the present invention to provide an adjustable steering angle for a handcycle which permits the rider to adjust the handcycle so that the turning sensitivity matches their riding style and the roads or pavement to be travelled upon.

Another object of the present invention is to provide an attitude control system for a handcycle which includes a novel mechanism allowing the length of the attitude control system mechanism to be adjusted so that the seat and forward frame can be properly center upright in relation to the rear wheels of the handcycle.

Another object of the present invention is to provide a handcycle having an adjustable steering angle which employs a lower pivot point on the main handcycle frame and which incorporates spherical bearings so as to provide smooth movement no matter what the steering angle is.

Still a further object of the present invention is to provide a novel attitude control system which includes a resilient member which may take the form of an elastomer element that is adapted to yieldably resist leaning forces developed during the riding of a handcycle by a rider.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
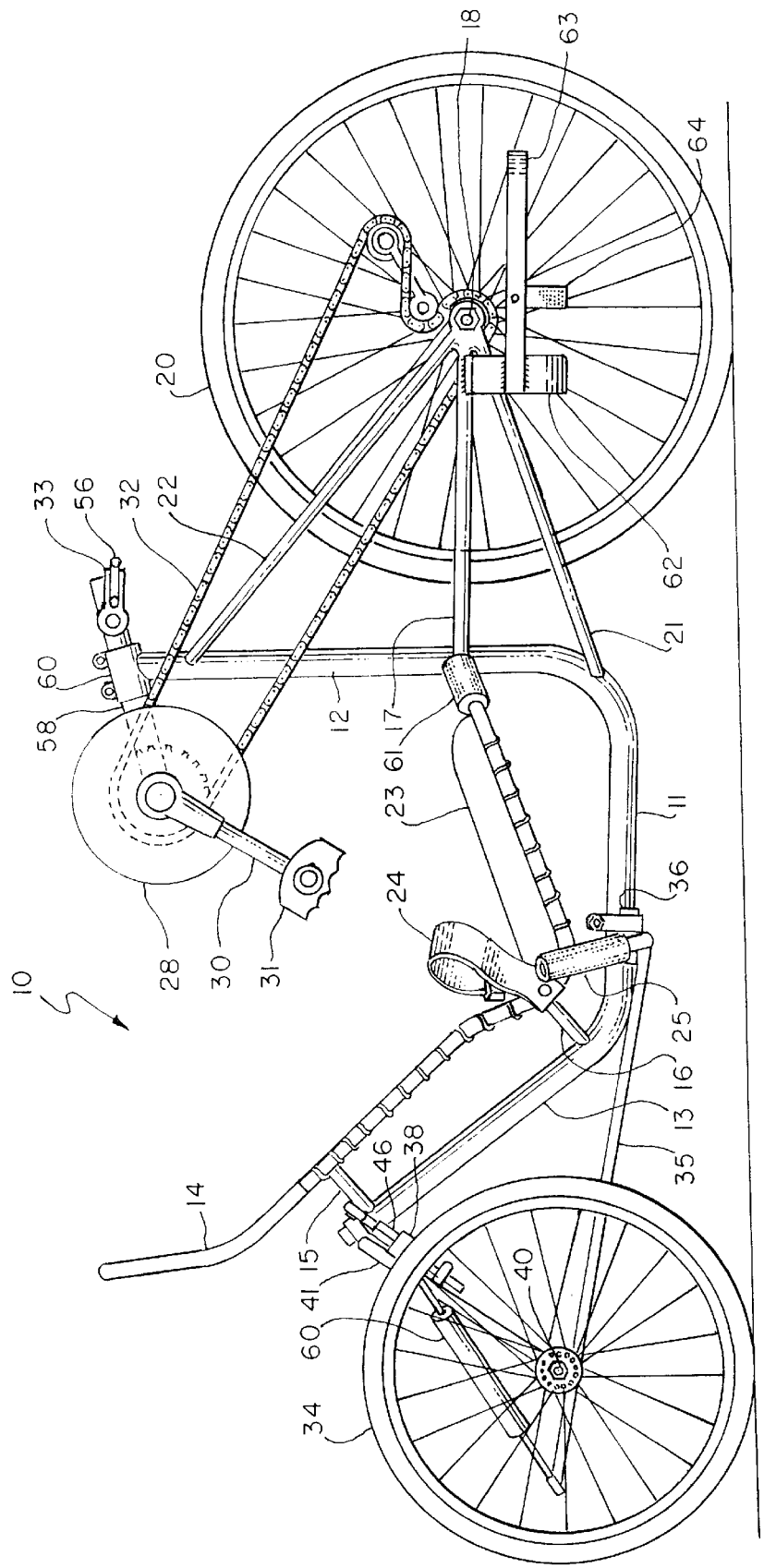
FIG. 1 is a side elevational view of a handcycle incorporating the present invention.
Figure 2:
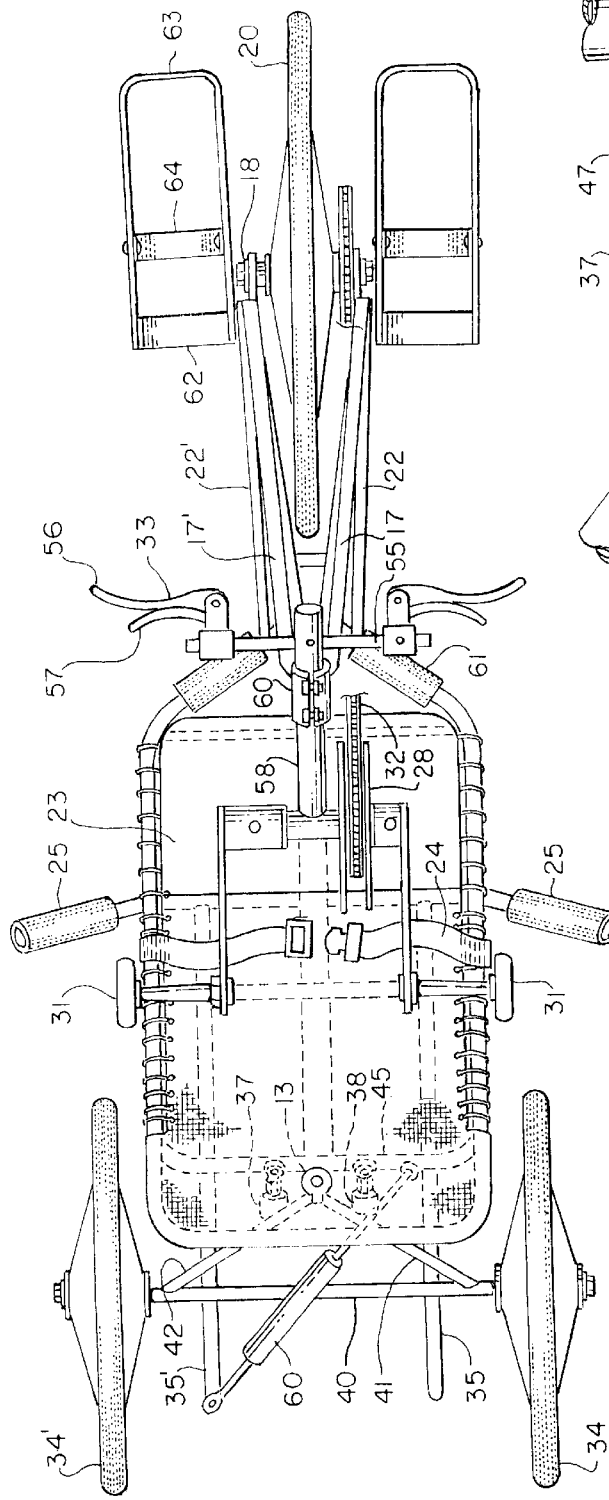
FIG. 2 is a top view of the handcycle shown in FIG. 1.

Referring to FIG. 1, the novel handcycle of the present invention is illustrated in the general direction of arrow 10 having a main frame of U-shaped configuration in side elevational view comprising a midsection 11 with a front upright member 12 at one end thereof and an angularly disposed member at its opposite end represented by numeral 13. A seat frame 14 is carried on the main frame by means of supports 15 and 16 as well as by a pair of braces 17 and 17', as shown in FIG. 2. The braces forwardly extend ahead of the front member 12 to terminate in an axle for supporting a front wheel 20 and the axle is indicated by numeral 18. Lower braces 21 and 21' are immediately below the upper braces 17 and 17' and the wheel 20 is operably disposed therebetween. Upper support braces 22 and 22' further are connected between the upper end of the front frame member 12 and the common mounting of the axle 18.

A cushioned seat 23 is carried between the opposite rods of frame 14 and may he secured thereto by lacing or straps. A seatbelt 24 is provided for releasably securing the occupant or driver to the seat. Hand grips 25 are attached to the central frame member 11 and may be used by the driver to be grasped by his hands when not powering or driving the front wheel 20. For driving the front wheel 20, a drive mechanism 28 is provided with a pair of hand cranks, such as crank 30, wherein each crank terminates in a pivoting hand grip 31. The hand grip is grasped by the hands of the user and the drive mechanism 28 is rotated nearby via a drive chain 32 to a series of sprockets and gearing which connect with the central axis of the front wheel 20. This mechanism does not form a part of the present invention. Brakes and a derailer or shifter is provided on the upper end of the front frame member 12 and is represented by the numeral 33.

A pair of rear wheels 34 and 34' are carried from the top of the rear frame member 13 and are supported by braces 35 and 35' from the central or mid frame member 11. One end of the rods 35 and 35' are attached to a sliding joint 36. Such a joint provides for an adjustable steering angle. This is achieved by sliding the lower pivot point of the joint along the central frame member 12. Spherical bearings are employed to permit smooth movement no matter what the steering angle is. As the steering angle is made steeper, the handcycle turns more sharply for a given amount of lean. As the steering angle is decreased so that it moves towards the horizontal, the handcycle does not turn very much for a given amount of lean. This feature allows the rider to adjust the handcycle so that the turning sensitivity matches the riding style and road conditions to be travelled upon.

Figure 3:
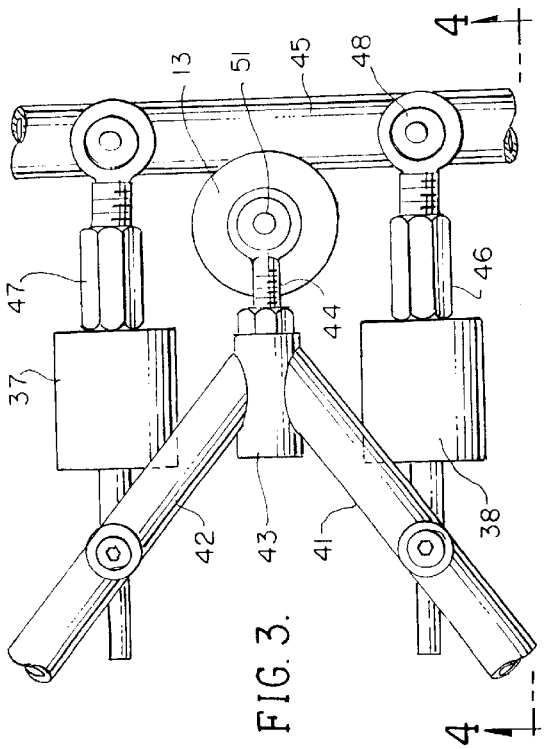
FIG. 3 is an enlarged elevational view of the attitude control system employed in the handcycle shown in FIGS. 1 and 2.

With respect to an attitude control system, it can be seen that the rear wheels 34 and 34' are attached and supported by the upper end of the main frame rear member 13 by a pair of resilient mechanisms, indicated by numerals 37 and 38. The resilient mechanism is more clearly shown in FIGS. 2–4 inclusive wherein it can be seen that the rear wheels 34 and 34' are carried on the opposite ends of a rear axle 40 which is supported from the rear frame member 13 by braces 41 and 42 respectively. The opposite ends of the braces join together at a fixture 43, as shown in FIG. 3, which, in turn, is adjustably connected to a rear frame member 13 via a coupling 44. Each of the respective resilient members 37 and 38 are connected between the crossbar 45 and each of these respective braces 41 and 42 by an adjustable threaded mechanism such as indicated by numerals 46 and 47. As an example, as in FIG. 4, the resilient element 38 is carried on a nut 46 which is in turning relationship with respect to a screw or threaded coupler 48 attached to the crossbar 45. The opposite end of the element or resilient member 38 is connected to brace 41 by means of a coupler 50.

Figure 4:
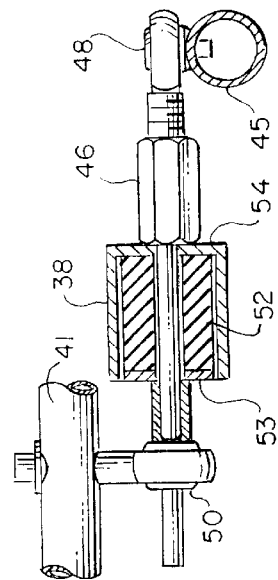
FIG. 4 is a sectional view, partly in fragmentation, showing the elastomer member employed in the attitude control system of the present invention.

Without some type of attitude control system, as represented by the present invention, the handcycle would be dynamically unstable. It can be seen that the center of mass of the rider is above the steering axis of the handcycle and that the weight of the rider attempts to make the handcycle lean to one side or the other. The attitude control system resists this tendency to lean. While only one such control is shown in FIGS. 1 and 4, there are two of these units represented by numerals 37 and 38, one on each side of an upper pivot point, represented by numeral 51. When the handcycle is centered upright, there is very little or no loading on the resilient or compressible members 37 or 38. As the rider leans to one side, the resiliency of the member acts like a coil spring, resisting the leaning forces. In one form of the invention, the resilient member takes the force of a compressible elastomer member and is illustrated in FIG. 4 by numeral 52. The member is carried on a plate 53 and is inserted into a cup 54 so that as the plate 53 is pressured against one member of the member 52, the cup 54 is pressued against the opposite end so as to provide compressibility. The hardness of the elastomer can be changed to closely match the forces applied to it by riders of different weights, thus the proper stabilizing opposing force can be applied. The material of the elastomer is also such that when the rider shifts his weight to bring the bike upright to center, the elastomer does not act like a coil spring but instead releases the stored forced energy in a slow and controlled fashion so that the handcycle and rider are not forced past center which could lead to a divergent speed "wobble". In other words, the elastomers are internally damped, compared to a coil spring. It should also be noticed that the coupling and threaded shank allow the length of each attitude control mechanism to be adjusted, in order that the seat and forward frame can be properly center upright in relation to the rear wheel. This mechanism is not used to put an initial or pre-load on the elastomer, as the handcycle would then not return completely to the center.

Referring in further detail to FIG. 2, the brake and shift or derailer mechanism 33 are innovative mechanisms permitting the rider to brake and shift gears without taking his hands from the pedals. The shifters are attached by a separate bar 55 which is parallel positioned to the axis of the pedal spindles and close enough for the fingers to reach the levers without letting go of the pedals. The grip pedals 31 are illustrated in their rearmost position but in their forward position, they are close to the brake and shift levers 33 so that the user's fingers can reach the levers without letting go of the grip pedals 31. A brake lever is indicated by numeral 56 while the shift lever is indicated by numeral 57. Numeral 58 illustrates the support and mounting of the drive sprocket mechanism, including the hand grip pedal 31, to the main front frame member 12. A clamp 60 may be employed for connection.

Also, a shock absorber or shock damper 60 is operably provided between the extreme end of support brace 35' and the bar 45.

FIGS. 1 and 2 also illustrate leg supports for the rider which include cushioned pads, such as pad 61, and leg rests which comprise braces 62, leg loop 63 and downwardly depending leg strap 64.

Figure 5:
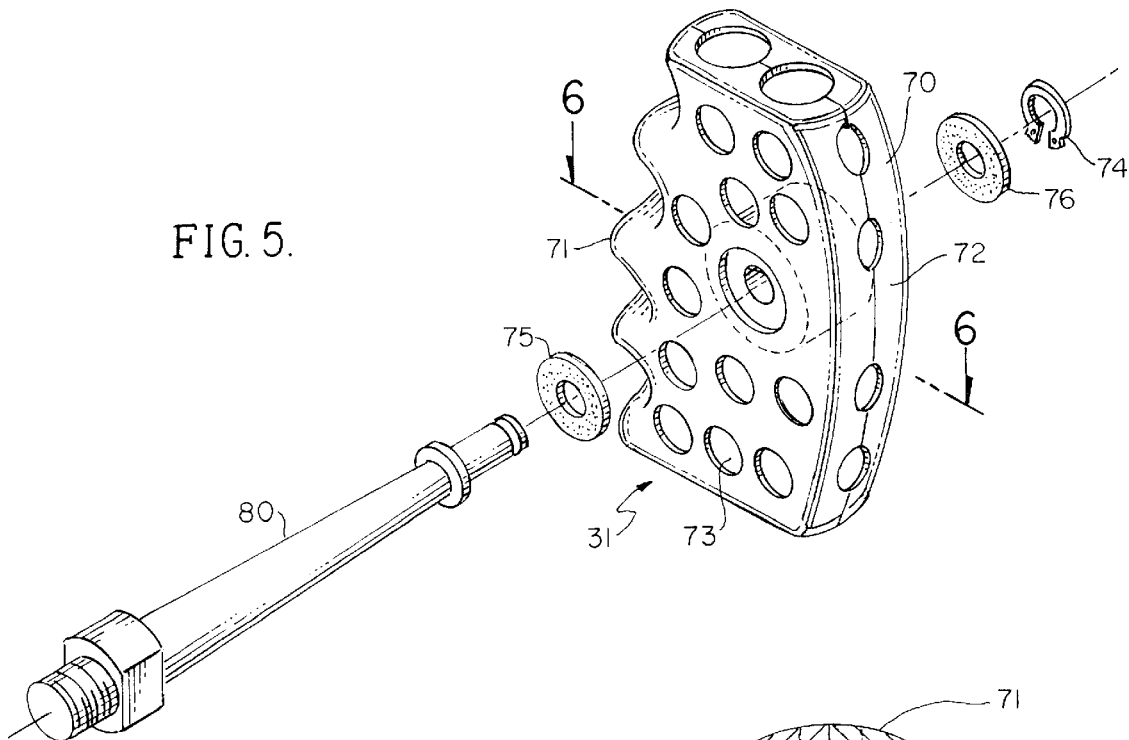
FIG. 5 is an exploded perspective view showing the novel hand grip used on the handcycle shown in FIGS. 1 and 2.
Figure 6:
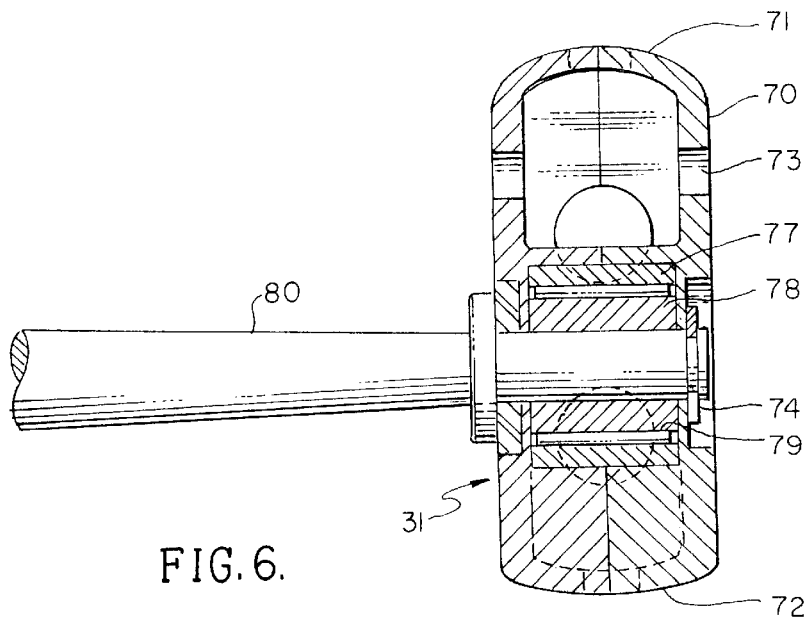
FIG. 6 is a sectional view of the hand grip shown in FIG. 5 as taken in the direction of arrows 6—6 thereof.

Referring now in detail to FIGS. 5 and 6, enlarged views of a hand grip 31 are indicated which include a substantially hollow grip 70 which is elongated and has one side contoured to accept configuration of the closed fingers on the hand of the user. This configuration is indicated by numeral 71 while the opposite side of the grip 70 is contoured to fit the palm of the hand of the user and is indicated by numeral 72. In order to provide ventilation and lightness of weight, the grip 70 is provided with a plurality of openings leading into the interior and a typical opening is indicated by numeral 73. The grip 70 is rotatably mounted on the end of shaft 80 and a lock washer 74 secures the grip to the end of the shaft. Washers 75 and 76 are provided. In FIG. 6, it can be seen that a needle bearing secures the grip 70 onto the end of shaft 80 which includes an outer race 77, an inner race 78 and a plurality of needle bearings, such as needle bearing 79 disposed between the inner and outer races.

In view of the foregoing, it can be seen that the novel handcycle of the present invention provides a novel means for providing an attitude control system as well as an adjustable steering angle. The handcycle is preferably composed of tubular material so that it is light in weight.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A handcycle operated by the hands of a driver comprising:

a frame having a single rotatable front wheel and a pair of rotatable rear wheels;

control means for controlling the attitude of said frame in response to driver orientation and interconnecting said paid of rotatable rear wheels to said frame operable to resist leaning forces;

hand driving means mounted on said frame and operably coupled to said front wheel for providing manual power thereto;

said control means includes a compressible resilient element incorporated between said pair of rear wheels and said frame;

said control means further includes a pivot bearing disposed on said frame;

a pair of braces interconnecting said pair of rear wheels to said pivot bearing;

said compressible resilient element connected between each of said braces of said pair and said frame and said compressible resilient element separated by said pivot bearing;

said compressible resilient element is an elastomer member enclosed in a telescoping housing;

said manual driving means includes a pair of contoured handgrips of a pistol-grip type;

each of said handgrips having opposite sides separated by an internal cavity;

a plurality of openings in each of said sides communicating said cavity exteriorly of each of said handgrips each handgrip has a curved palm fitted rear surface and a series of spaced-apart mounds on a front surface to accommodate clenched fingers of the user about each of said respective handgrips;

a shock damper connected between said pair of rear wheels and said frame; and said pair of braces converge from connection with said pair of rear wheels towards said frame to terminate adjacent to each other at said pivot bearing.

* * * * *